H. J. FERRIS.
PIGPEN.
APPLICATION FILED NOV. 18, 1918.
1,312,242.
Patented Aug. 5, 1919.
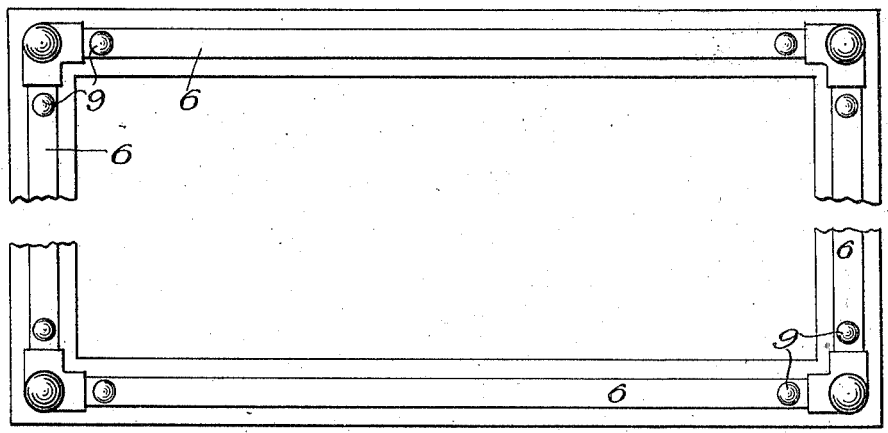
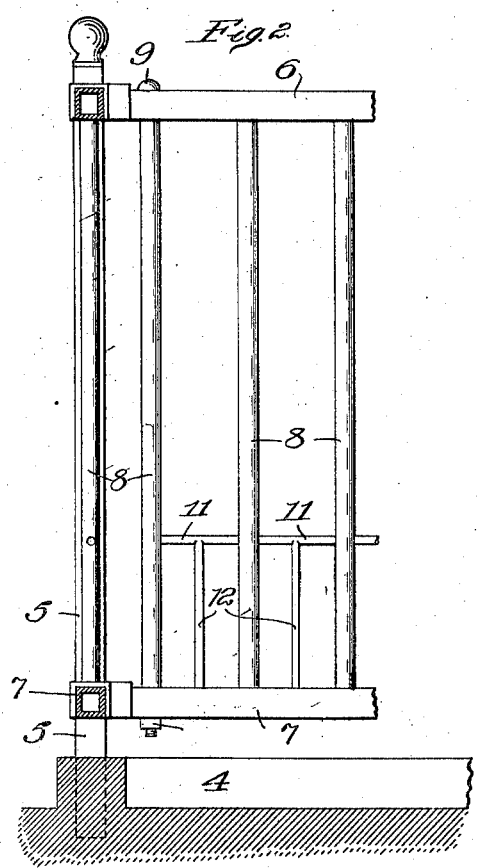
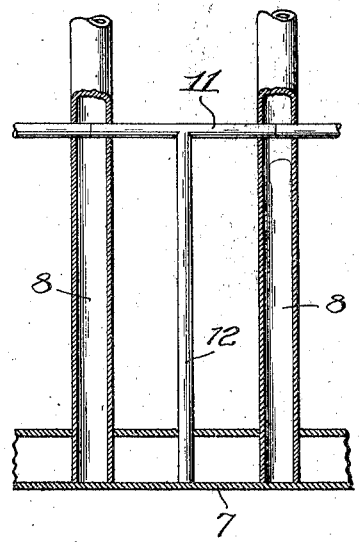
Inventor:
Howard J. Ferris.
By Dyrenforth, Lee, Chritton and Wiles,
Attys

UNITED STATES PATENT OFFICE.

HOWARD J. FERRIS, OF HARVARD, ILLINOIS, ASSIGNOR TO HUNT, HELM, FERRIS & COMPANY, OF HARVARD, ILLINOIS, A CORPORATION OF ILLINOIS.

PIGPEN.

1,312,242.      Specification of Letters Patent.      Patented Aug. 5, 1919.

Application filed November 18, 1918. Serial No. 262,993.

*To all whom it may concern:*

Be it known that I, HOWARD J. FERRIS, a citizen of the United States, residing at Harvard, in the county of McHenry and State of Illinois, have invented a new and useful Improvement in Pigpens, of which the following is a specification.

My invention relates to certain new and useful improvements in pig pens and is fully described and explained in the specification and shown in the accompanying drawings, in which:

Figure 1 is a top plan illustrating my invention; Fig. 2 is a view showing one wall in section and one in elevation; and Fig. 3 is a longitudinal section through one of the sides of the pen, showing the manner of construction.

Referring to the drawings, 4 is a curb, preferably of concrete, provided with corner posts 5 between which are clamped upper and lower horizontal members 6 and 7 respectively, these being preferably of tubing square in cross-section. The upper and lower members 6 and 7 are perforated on their opposing faces to receive vertical tubular members 8 through certain of which are passed rods held in place by heads 9 and nuts 10 at opposite ends, and adapted to hold the structure firmly together.

The vertical tubular members 8 are perforated by diametrical openings lying in a plane of the upper and lower members 6 and 7, and into the perforations thus formed are thrust opposite ends of short rods 11. To the centers of the rods 11 are secured, preferably by welding, vertical members 12 so as to form T-shaped structures of which the bars 11 are the heads. The lower ends of the T-shaped members are inserted in the relatively smaller perforations in the horizontal members 7.

By the structure thus formed there is provided a cheap and easily assembled pen which possesses in a high degree the usual qualities required in such structures of the most modern type, and, in addition, the lower part of the pen-wall is provided with a barrier whose interstices are much smaller than those above, whereby the escape of the smaller pigs is prevented, without the extra expense of construction which is necessary in those cases where it is sought to make the entire pen-wall adequate to keep the small animals from escaping. The means whereby the interstices of the lower part of the wall structure are decreased in size, is particularly simple, strong and cheap.

I realize that considerable variation is possible in the details of this construction without departing from the spirit of my invention; therefore I do not intend to limit myself to the specific form herein shown and described except as pointed out in the following claims, in which it is my intention to claim all the novelty inherent in the construction as broadly as is permitted by the state of the art.

I claim as new and desire to secure by Letters Patent:

1. In a pig-pen, sides comprising horizontal members at top and bottom, main vertical members extending between and supported by the horizontal members, and T-shaped members, each consisting of a horizontal head and a vertical stem, the ends of the horizontal heads being set in perforations in the main vertical members midway between their ends, and the depending lower ends of the stems of the T-shaped members being set in perforations in the lower vertical member midway between the two adjacent main vertical members.

2. In a pig-pen, sides comprising upper and lower horizontal tubular members square in cross-section and perforated on their opposing faces, main vertical members set in the perforations and bearing against the upper and lower parts of the aforesaid square tubular members, and T-shaped members, each comprising a horizontal head and a depending vertical stem, the ends of the horizontal heads being set in perforations in the two adjacent main vertical members and the lower ends of the depending stems being set in perforations in the lower horizontal member.

In testimony whereof, I have hereunto set my hand and affixed my seal this 15th day of November, 1918.

HOWARD J. FERRIS. [L. S.]

Copies of this patent may be obtained for five cents each, by addressing the "Commissioner of Patents. Washington, D. C."